US007885679B2

(12) United States Patent
Hosokawa (10) Patent No.: US 7,885,679 B2
(45) Date of Patent: Feb. 8, 2011

(54) MOBILE COMMUNICATION TERMINAL AND METHOD OF ACCOMPLISHING TPC IN MOBILE COMMUNICATION TERMINAL

(75) Inventor: Taisuke Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 860 days.

(21) Appl. No.: 11/813,185

(22) PCT Filed: Jan. 12, 2006

(86) PCT No.: PCT/JP2006/300671

§ 371 (c)(1),
(2), (4) Date: Jun. 29, 2007

(87) PCT Pub. No.: WO2006/075780

PCT Pub. Date: Jul. 20, 2006

(65) Prior Publication Data
US 2009/0275290 A1 Nov. 5, 2009

(30) Foreign Application Priority Data
Jan. 13, 2005 (JP) .............................. 2005-006306

(51) Int. Cl.
*H04B 17/00* (2006.01)
*H04B 7/00* (2006.01)
*H04B 1/00* (2006.01)
*H04B 7/185* (2006.01)
*H04M 11/04* (2006.01)
*H04W 36/00* (2009.01)
*H04W 74/00* (2009.01)

(52) U.S. Cl. .................. 455/522; 455/67.13; 455/404.1; 455/404.2; 455/440; 455/69; 455/456.1; 455/456.3; 370/318

(58) Field of Classification Search .............. 455/67.13, 455/522, 404.1–404.2, 440, 456.1, 456.3, 455/69; 370/318
See application file for complete search history.

(56) References Cited

U.S. PATENT DOCUMENTS 6,341,224 B1 * 1/2002 Dohi et al. ................... 455/522
6,625,465 B1 * 9/2003 Moon et al. ................. 455/522

(Continued)

FOREIGN PATENT DOCUMENTS

JP        09-009352 A        1/1997

(Continued)

Primary Examiner—Matthew D. Anderson
Assistant Examiner—Bobbak Safaipour
(74) Attorney, Agent, or Firm—Sughrue Mion, PLLC (57) ABSTRACT

The mobile communication terminal includes a first unit which measures a SIR of a signal received from a base station, a second unit which determines a target SIR, and a third unit which compares the SIR measured by the first unit to the target SIR, and produces TPC data in accordance with the result of the comparison, the TPC data being used for controlling signal-transmission power by which the base station transmits a signal to the mobile communication terminal, the TPC data being transmitted to the base station together with a signal to be transmitted to the base station from the mobile communication terminal. The second unit lowers the target SIR if a signal for calling is not received from the base station by a predetermined period of time, and further if communication quality between the mobile communication terminal and the base station is equal to or greater than threshold quality.

13 Claims, 9 Drawing Sheets

U.S. PATENT DOCUMENTS 6,788,737 B1 * 9/2004 Miyoshi et al. ............. 375/219
6,898,439 B2 * 5/2005 Kayama et al. ............. 455/522
7,187,942 B2 * 3/2007 Hosokawa ................. 455/522
7,260,415 B1 * 8/2007 Oh ............................ 455/522
7,522,561 B2 * 4/2009 Yano et al. ................. 370/333
7,529,321 B1 * 5/2009 Shiraishi et al. ............ 375/329

FOREIGN PATENT DOCUMENTS

JP          2002-523988 A    7/2002
WO          WO 97/50197 A1   12/1997

* cited by examiner

MOBILE COMMUNICATION TERMINAL AND METHOD OF ACCOMPLISHING TPC IN MOBILE COMMUNICATION TERMINAL

BACKGROUND OF THE INVENTION

1. Field of the Invention

The invention relates to a mobile communication terminal and a method of accomplishing transmission power control (TPC) in a mobile communication terminal.

2. Description of the Related Art

In a W-CDMA (Wideband Code Division Multiple Access) system which have been recently popularly used in a wireless communication system, since a common frequency is used in all channels, communication channel is frequently interfered with other communication channels. A channel capacity is dependent highly on such interferences.

From a standpoint of a channel capacity, it is preferable to minimize transmission power by which a base station transmits data to a mobile communication terminal, in order to increase channel capacity.

However, if such transmission power is mandatorily reduced, there is caused problems of reduction in a calling success rate and necessity of repeatedly transmitting data.

In order to avoid such problems, for instance, Japanese Patent Application Publication No. 09-009352 has suggested a mobile communication terminal which controls an amplification level of transmission power by which the mobile communication terminal transmits a signal to a base station. Specifically, the transmission power is increased only in a predetermined period of time, ensuring a high efficiency at which the mobile communication can receives a call from a base station, with reduction in power consumption.

However, the suggested mobile communication terminal is directed only to control in transmission power by which the mobile communication terminal transmits a signal to a base station, but is not directed to control in transmission power by which a base station transmits a signal to the mobile communication terminal.

Communication quality in a mobile communication terminal is dependent on a SIR (Signal to Interference Ratio) defined as a ratio of power of an interference signal to power of a received signal. Accordingly, even if a base station transmits a signal to a mobile communication terminal with much power, communication quality would be deteriorated, if power of an interference signal is also high. Thus, it is not always to be able to provide desired communication quality, only if control is accomplished to an amplification level of power by which the mobile communication terminal transmits a signal to a base station.

In addition, the above-mentioned related mobile communication terminal is accompanied with a problem that a high target SIR causes a high load to a channel capacity in a mobile network, resulting in reduction in a number of mobile communication terminals covered by a base station.

On the other hand, a small target SIR causes a problem of failure in establishment in communication between a base station and a mobile communication terminal, and extension in time necessary for establishment in communication between a base station and a mobile communication terminal, caused by repetition in transmission of DCCH (Dedicated Control CHannel) data acting as a calling signal.

In view of the above-mentioned problems in the related mobile communication terminal, it is an object of the present invention to provide a mobile communication terminal which is capable of reducing a load to a channel capacity in a mobile network, and preventing deterioration in a calling success rate.

It is also an object of the present invention to provide a method of accomplishing transmission power control in a mobile communication terminal, which is capable of doing the same.

It is further an object of the present invention to provide a program for causing a computer to carry out the above-mentioned method.

SUMMARY OF THE INVENTION

In one aspect of the present invention, there is provided a mobile communication terminal including a first unit which measures a SIR of a signal received from a base station, a second unit which determines a target SIR, and a third unit which compares the SIR measured by the first unit to the target SIR, and produces TPC data in accordance with the result of the comparison, the TPC data being used for controlling signal-transmission power by which the base station transmits a signal to the mobile communication terminal, the TPC data being transmitted to the base station together with a signal to be transmitted to the base station from the mobile communication terminal, wherein the second unit lowers the target SIR if a signal for calling is not received from the base station by a predetermined period of time, and further if communication quality between the mobile communication terminal and the base station is equal to or greater than threshold quality.

The mobile communication terminal may be designed to further include a fourth unit which decodes a signal received from the base station, and applies CRC operation to the decoded signal, wherein the second unit judges whether the communication quality is equal to or greater than the threshold quality, based on the result of the CRC operation.

For instance, the second unit may judge the communication quality equal to or greater than the threshold quality, if there does not occur CRC-NG in the predetermined period of time.

The mobile communication terminal may be designed to further include a fourth unit which decodes a signal received from the base station, and checks whether there is a loss in sequential numbers applied to the signal, wherein the second unit judges whether the communication quality is equal to or greater than the threshold quality, based on the result of checking the loss.

In another aspect of the present invention, there is provided a method of accomplishing transmission power control in a mobile communication terminal, including (a) measuring a SIR of a signal received from a base station, (b) comparing the measured SIR to a target SIR to thereby produce TPC data in accordance with the result of the comparison, the TPC data being used for controlling signal-transmission power by which the base station transmits a signal to the mobile communication terminal, (c) transmitting the TPC data to the base station together with a signal to be transmitted to the base station from the mobile communication terminal, and (d) lowering the target SIR if a signal for calling is not received from the base station by a predetermined period of time, and further if communication quality between the mobile communication terminal and the base station is equal to or greater than threshold quality.

The method may further include (e) decoding a signal received from the base station, and (f) applying CRC operation to the decoded signal, wherein the communication quality is judged whether equal to or greater than the threshold quality, based on the result of the CRC operation.

For instance, the communication quality is judged equal to or greater than the threshold quality, if there does not occur CRC-NG in the predetermined period of time.

The method may further include decoding a signal received from the base station, and checking whether there is a loss in sequential numbers applied to the signal, in which case, the communication quality is judged whether equal to or greater than the threshold quality, based on the result of checking the loss.

In still another aspect of the present invention, there is provided a program for causing a computer to carry out a method of accomplishing transmission power control in a mobile communication terminal, steps executed by the computer in accordance with the program including (a) comparing a SIR of a signal received from a base station to a target SIR to thereby produce TPC data in accordance with the result of the comparison, the TPC data being used for controlling signal-transmission power by which the base station transmits a signal to the mobile communication terminal, (b) transmitting the TPC data to the base station together with a signal to be transmitted to the base station from the mobile communication terminal, and (c) lowering the target SIR if a signal for calling is not received from the base station by a predetermined period of time, and further if communication quality between the mobile communication terminal and the base station is equal to or greater than threshold quality.

The steps may further include (d) decoding a signal received from the base station, and (e) applying CRC operation to the decoded signal, in which case, the communication quality is judged whether equal to or greater than the threshold quality, based on the result of the CRC operation.

For instance, the communication quality is judged equal to or greater than the threshold quality, if there does not occur CRC-NG in the predetermined period of time.

The steps may further include (d) decoding a signal received from the base station, and (e) checking whether there is a loss in sequential numbers applied to the signal, in which case, whether the communication quality is judged whether equal to or greater than the threshold quality, based on the result of checking the loss.

The exemplary advantages obtained by the aforementioned present invention will be described hereinbelow.

In accordance with the present invention, the target SIR is lowered, if a signal for calling is not received from a base station by a predetermined period of time, and further if communication quality between the mobile communication terminal and a base station is equal to or greater than threshold quality. Then, transmission power control data determined based on the thus lowered target SIR and the measured SIR is transmitted to a base station. Thus, an optimal target SIR is determined only after communication has been established between the mobile communication terminal and a base station. Accordingly, a base station is able to cover an increased number of mobile communication terminals without reduction in transmission power before establishment of communication between the mobile communication terminal and a base station, and further without extension in time necessary for establishment of communication between a base station and a mobile communication terminal, caused by repetition in transmission of DCCH (Dedicated Control CHannel) data. As a result, it is possible to reduce a load to channel capacity in a mobile network, and avoid deterioration in a calling success rate.

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

Exemplary embodiments in accordance with the present invention will be explained hereinbelow with reference to drawings.

First Exemplary Embodiment

Figure 1:
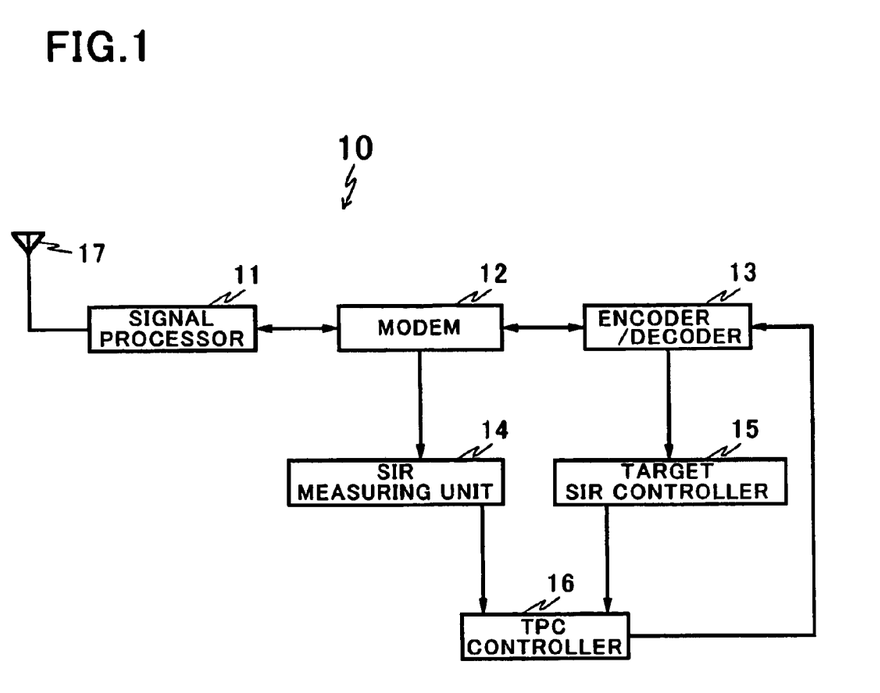
FIG. 1 is a block diagram of a mobile communication terminal in accordance with the first exemplary embodiment of the present invention.

FIG. 1 is a block diagram of a mobile communication terminal 10 in accordance with the first exemplary embodiment of the present invention.

The mobile communication terminal 10 is comprised of an antenna 17, a signal processor 11 which receives wireless signals from and transmits wireless signals to a base station through the antenna 17, and converts received wireless signals to electric signals or electric signals to be transmitted to wireless signals, a modem 12 which demodulates signals having been received from the signal processor 11, and modulates signals, and then, transmits the modulated signals to the signal processor 11, an encoder/decoder 13 which decodes the signals having been demodulated at the modem 12, and encodes signals, and then, transmits the encoded signals to the modem 12, an SIR measuring unit 14 which calculates an SIR, based on signals having been demodulated in the modem 12, a target SIR controller 15 which determines a target SIR, based on signals having been decoded in the encoder/decoder 13, and a TPC controller 16 which determines TPC (Transmission Power Control) bit used for controlling transmission power by which a base station transmits wireless signals to the mobile communication terminal 10, based on an SIR calculated in the SIR measuring unit 14 and the target SIR determined in the target SIR controller 15.

Signals having been encoded in the encoder/decoder 13 are modulated in the modem 12, and then, converted into wireless signals in the signal processor 11. Then, the wireless signals are transmitted to a base station through the antenna 17.

Figure 2:
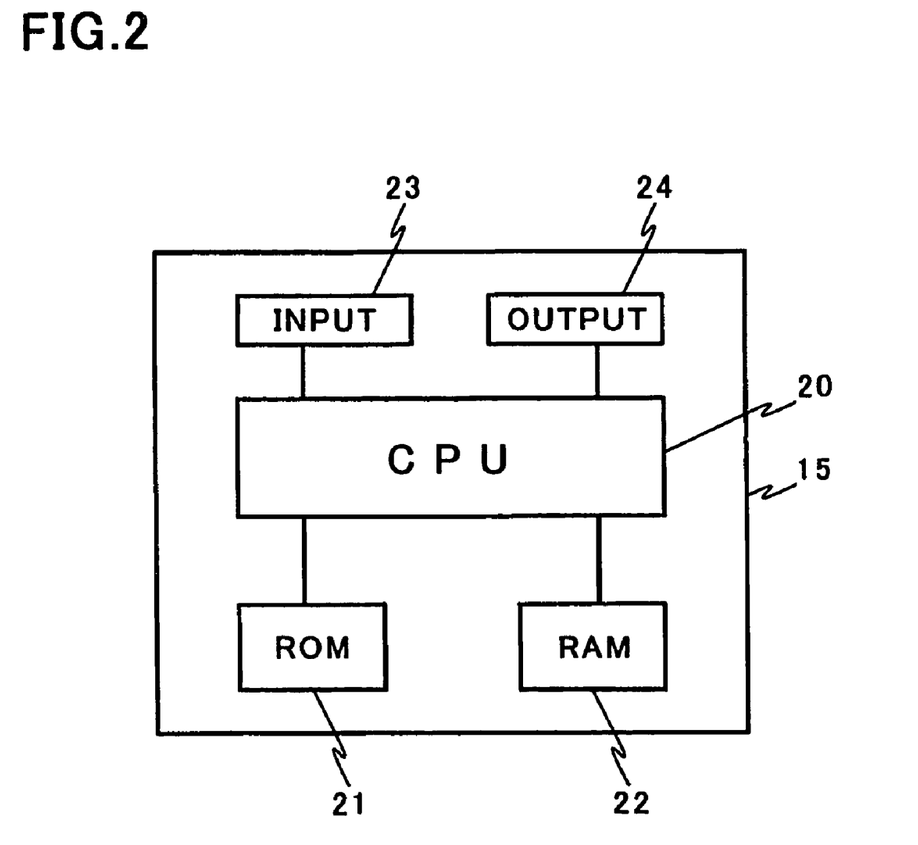
FIG. 2 is a block diagram of the target SIR controller.

FIG. 2 is a block diagram of the target SIR controller 15.

As illustrated in FIG. 2, the target SIR controller 15 is comprised of a central processing unit (CPU) 20, a first memory 21, a second memory 22, an input interface 23 through which a command and/or data is input into the central processing unit 20, and an output interface 24 through which a result of steps having been executed by the central processing unit 20 is output.

Each of the first and second memories 21 and 22 is comprised of a semiconductor memory such as a read only memory (ROM), a random access memory (RAM) or an IC memory card, or a storage device such as a flexible disc, a hard disc or an optic magnetic disc. In the first exemplary embodiment, the first memory 21 is comprised of ROM, and the second memory 22 is comprised of RAM.

The first memory 21 stores therein a program for determining a target SIR. The second memory 22 stores therein various data and parameters. The central processing unit 20 reads the program out of the first memory 21, and executes the program. Thus, the central processing unit 20 operates in accordance with the program stored in the first memory 21.

Figure 3:
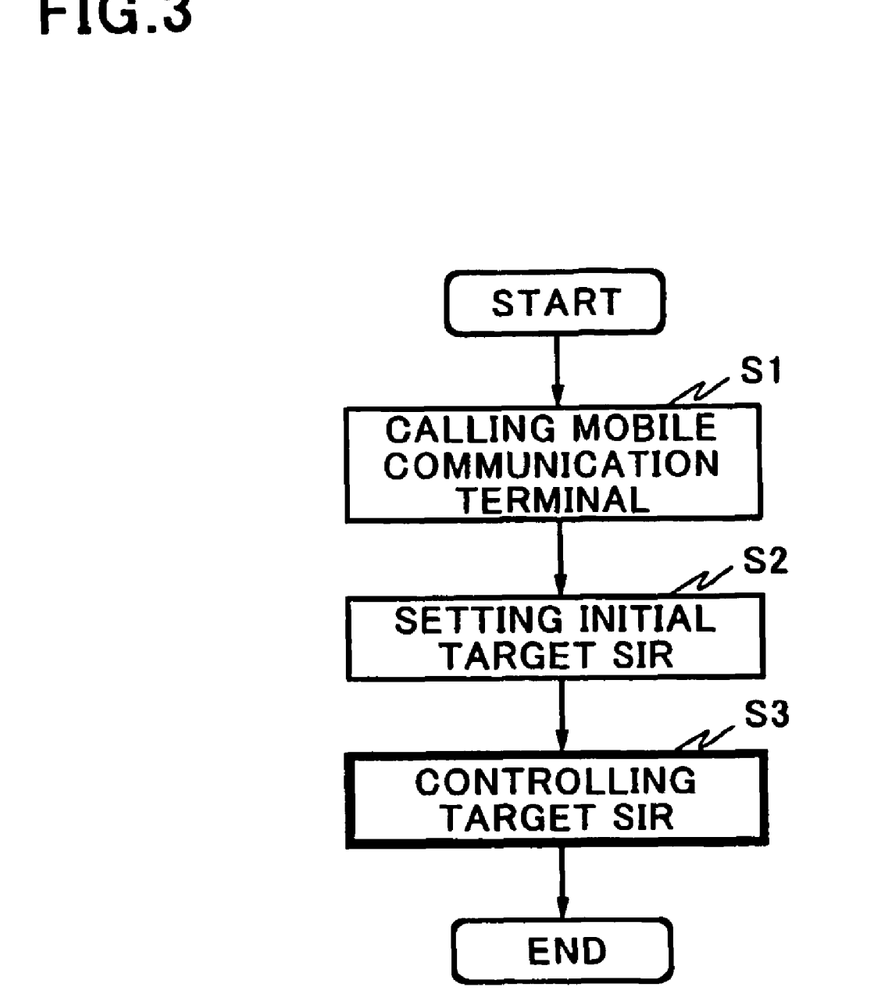
FIG. 3 is a flow chart showing steps to be carried out by the mobile communication terminal illustrated in FIG. 1.

FIG. 3 is a flow chart showing steps to be carried out by the mobile communication terminal 10.

Hereinbelow is explained an operation of the mobile communication terminal 10 with reference to FIG. 3.

First, in order to establish communication between the mobile communication terminal 10 and a base station, the mobile communication terminal 10 is called in step S1.

Then, channel is established between the mobile communication terminal 10 and a base station. Then, the target SIR controller 15 reads a target SIR out of a memory (not illustrated) as an initial target SIR, in step S2.

Then, control to the thus read out target SIR is accomplished in step S3.

Figure 4A:
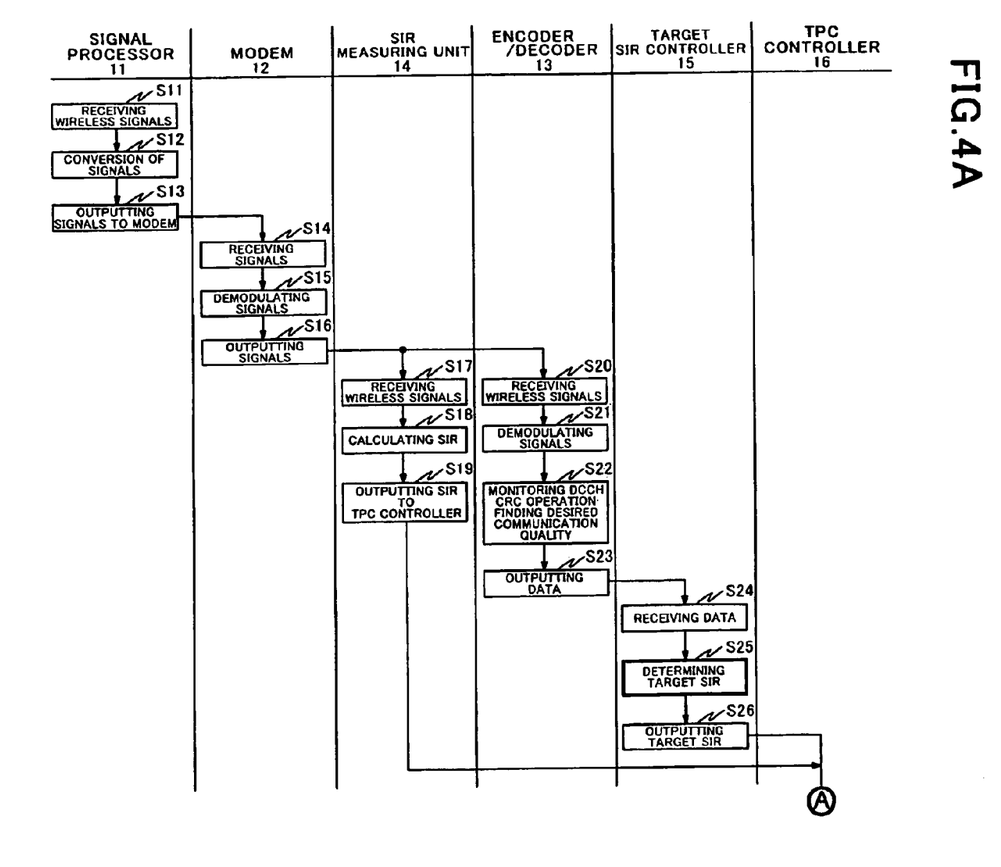
FIG. 4A is a flow chart showing an example of steps to be carried out by the mobile communication terminal illustrated in FIG. 1, when a target SIR is controlled.
Figure 4B:
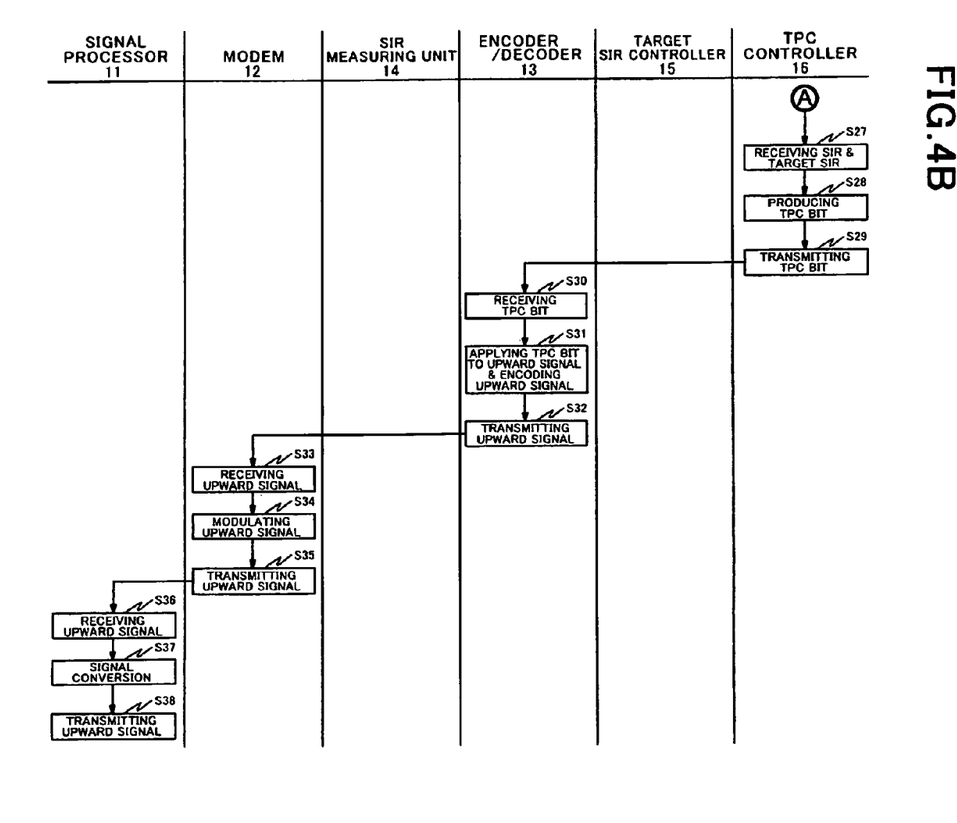
FIG. 4B is a flow chart showing steps to be carried subsequently to the steps illustrated in FIG. 4A.

FIGS. 4A and 4B are flow charts showing an example of steps to be carried out by the mobile communication terminal 10 for controlling a target SIR.

Hereinbelow is explained the control to a target SIR with reference to FIGS. 4A and 4B.

With reference to FIG. 4A, first, wireless signals having been transmitted from a base station are received at the signal processor 11 through the antenna 17 in step S11.

Then, the received wireless signals are converted into electric signals in step S12.

The electric signals 12 are output to the modem 12 from the signal processor 11 in step S13.

On receipt of the signals from the signal processor 11 in step S14, the modem 12 demodulates the signals in step S15.

The modem 12 transmits the thus demodulated signals to the encoder/decoder 13 and the SIR measuring unit 14 in step S16.

On receipt of the signals from the modem 12 in step S17, the SIR measuring unit 14 calculates an SIR, based on the received signals, in step S18. The SIR measuring unit 14 transmits the thus calculated SIR to the TPC controller 16 in step S19.

On receipt of the signals from the modem 12 in step S20, the encoder/decoder 13 demodulates the received signals in step S21.

Then, the encoder/decoder 13 not only judges whether the demodulated signals are comprised of DCCH (dedicated control channel) data, namely, signals used for establishing communication, to thereby monitor whether DCCH data is received, but also applies CRC (cyclic redundancy check) operation to the demodulated signals in order to judge quality of communication made between the mobile communication terminal 10 and a base station, in step S22.

The encoder/decoder 13 further finds data indicative of desired communication quality out of the demodulated signals in step S22.

Then, the encoder/decoder 13 transmits data indicative of receipt status of DCCH data, the results of CRC operation, and data indicative of desired communication quality to the target SIR controller 15 in step S23.

On receipt of data indicative of receipt status of DCCH data, the results of CRC operation, and data indicative of desired communication quality from the encoder/decoder 13 in step S24, the target SIR controller 15 determines a target SIR, based on the received data, in step S25.

Figure 5:
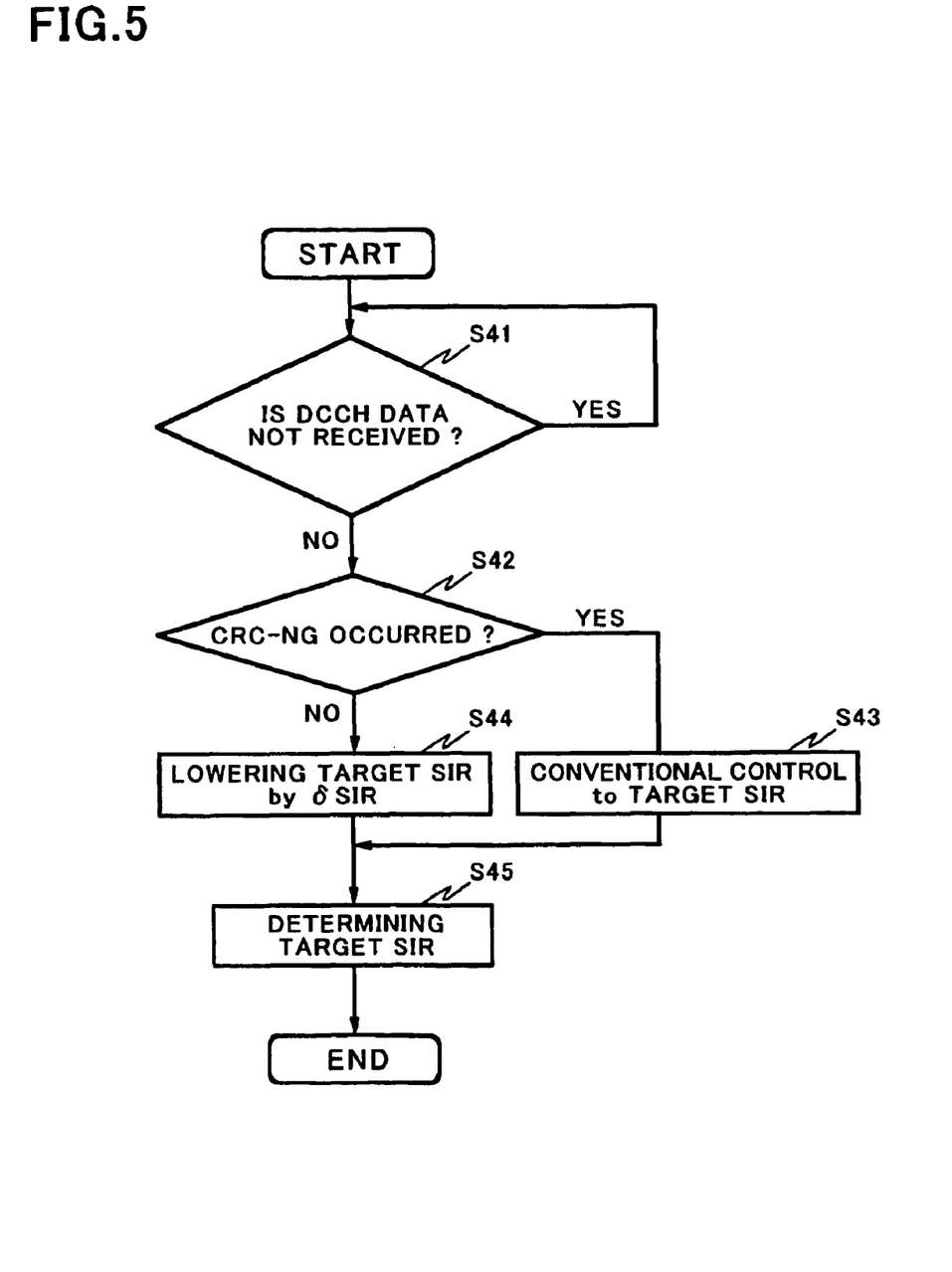
FIG. 5 is a flow chart showing an example of steps to be carried out by the mobile communication terminal illustrated in FIG. 1, when a target SIR is determined.

FIG. 5 is a flow chart showing an example of steps to be carried out by the mobile communication terminal 10 to determine a target SIR.

Hereinbelow is explained how a target SIR is determined with reference to FIG. 5.

First, the target SIR controller 15 judges whether a transport block of DCCH data is not received for a predetermined period of time, based on the data indicative of receipt status of DCCH data, received from the encoder/decoder 13, in step S41.

If the target SIR controller 15 judges that a transport block of DCCH data is received during a predetermined period of time (YES in step S41), the target SIR controller 15 considers that communication between the mobile communication terminal 10 and a base station is not established yet, and repeats judging whether a transport block of DCCH data is not received for a predetermined period of time until the target SIR controller 15 judges that a transport block of DCCH data is not received for a predetermined period of time, in order to avoid reduction a completion ratio of establishing communication between the mobile communication terminal 10 and a base station.

Herein, the above-mentioned predetermined period of time may be set in advance in a memory (not illustrated) of the mobile communication terminal 10, or may be inserted into data to be received at the signal processor 11 through the antenna 17.

If the target SIR controller 15 judges that a transport block of DCCH data is not received during a predetermined period of time (NO in step S41), the target SIR controller 15 considers that establishment of communication between the mobile communication terminal 10 and a base station has been completed, and judges whether there occurred CRC-NG in the transport channel in a period of time equal to the above-mentioned predetermined period of time in which receipt status of DCCH data was monitored, based on the result of CRC operation input into the target SIR controller 15, in step S42.

If the target SIR controller 15 judges that there occurred CRC-NG in the transport channel (YES in step S42), the target SIR controller 15 applies conventional control to a target SIR in accordance with desired communication quality and actual communication quality in step S43.

Figure 6:
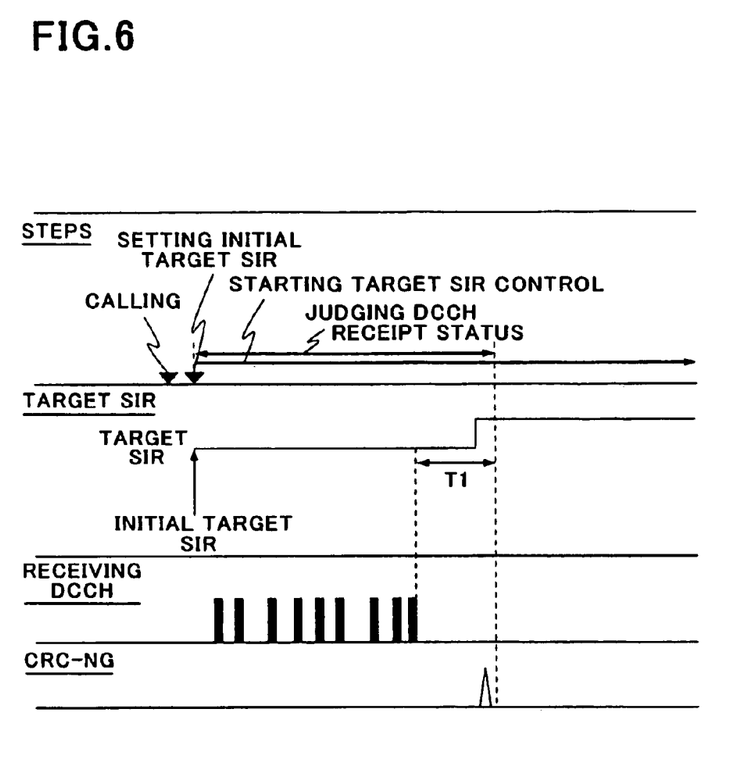
FIG. 6 is a timing chart showing steps to be carried out when CRC-NG is judged to occur in a predetermined period of time.

FIG. 6 is a timing chart showing steps to be carried out when CRC-NG is judged to occur in a predetermined period of time.

In FIG. 6, a predetermined period of time is indicated as T1. If the target SIR controller 15 finds out that a transport block of DCCH data was not received during T1, but there occurred CRC-NG during T1, the target SIR controller 15 judges that communication quality is poor or smaller than predetermined threshold quality, because there occurred CRC-NG regardless of that conventional SIR control was accomplished in accordance with desired communication quality and actual communication quality. Thus, the target SIR controller 15 raises a target SIR.

If the target SIR controller 15 judges that there did not occur CRC-NG in the transport channel (NO in step S42), the target SIR controller 15 judges that communication quality is good or equal to or greater than the predetermined threshold quality. Thus, the target SIR controller 15 lowers a target SIR by a predetermined degree in step S44.

Herein, the predetermined degree may be set in advance in a memory (not illustrated) of the mobile communication terminal 10, or may be input into the memory when the initial target SIR is determined.

Figure 7:
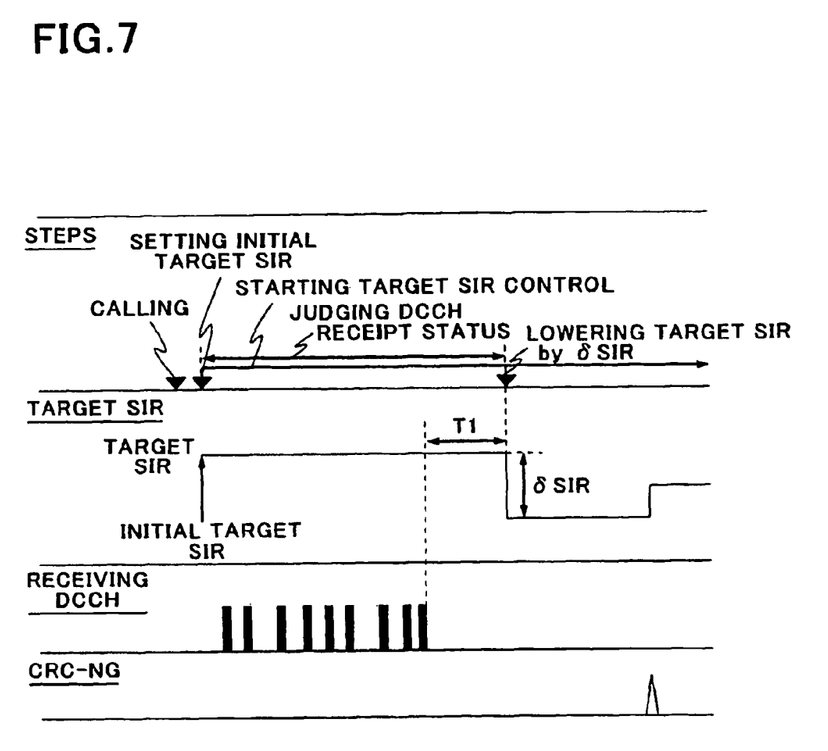
FIG. 7 is a timing chart showing steps to be carried out when CRC-NG is judged not to occur in a predetermined period of time.

FIG. 7 is a timing chart showing steps to be carried out when CRC-NG is judged not to occur in a predetermined period of time.

In FIG. 7, a predetermined period of time is indicated as T1. If the target SIR controller 15 finds out that a transport block of DCCH data was not received during T1, and there did not occur CRC-NG during T1, the target SIR controller 15 judges that communication quality is good or equal to or greater than the predetermined threshold quality.

Thus, the target SIR controller 15 lowers a target SIR by δ SIR in step S44, as illustrated in FIG. 7.

Thus, a target SIR is determined in step S45 in accordance with the target SIR control carried out in step S43 or S44.

The thus determined target SIR is output to the TPC controller 16 from the target SIR controller 15 in step S26.

With reference to FIG. 4B, on receipt of the SIR output from the SIR measuring unit 14 and the target SIR output from the target SIR controller 15 in step S27, the TPC controller 16 compares the received SIR with the received target SIR, and produces TPC bit, based on the result of the comparison in step S28. Herein, TPC bit is used for controlling transmission power by which a base station transmits wireless signals to the mobile communication terminal 10.

The TPC controller 16 produces TPC bit in accordance with which transmission power by which a base station transmits wireless signals to the mobile communication terminal 10 is increased, if the SIR output from the SIR measuring unit 14 is smaller than the target SIR output from the target SIR controller 15, or produces TPC bit in accordance with which transmission power by which a base station transmits wireless signals to the mobile communication terminal 10 is reduced, if the SIR output from the SIR measuring unit 14 is equal to or greater than the target SIR output from the target SIR controller 15.

The TPC controller 16 transmits the TPC bit to the encoder/decoder 13 in step S29.

On receipt of the TPC bit from the TPC controller 16 in step S30, the encoder/decoder 13 applies the received TPC bit to an up-channel signal, and encodes the up-channel signal in step S31. Then, the outputs the thus encoded up-channel signal to the modem 12 in step S32.

On receipt of the up-channel signal from the encoder/decoder 13 in step S33, the modem 12 modulates the received up-channel signal in step S34, and then, transmits the thus modulated up-channel signal to the signal processor 11 in step S35.

On receipt of the up-channel signal from the modem 12 in step S36, the signal processor 11 converts the received up-channel signal or an electric signal into a wireless signal in step S37.

Then, the signal processor 11 transmits the wireless signal to a base station through the antenna 17 in step S38.

Second Exemplary Embodiment

In the above-mentioned first exemplary embodiment, the target SIR controller 15 is designed to judge whether communication quality is good or poor by carrying out CRC operation.

In the second exemplary embodiment, the target SIR controller 15 is designed to judge whether communication quality is good or poor, namely, whether communication quality is equal to or greater than, or smaller than threshold quality by checking whether there is a loss in sequential numbers applied to a signal received from a base station.

Figure 8A:
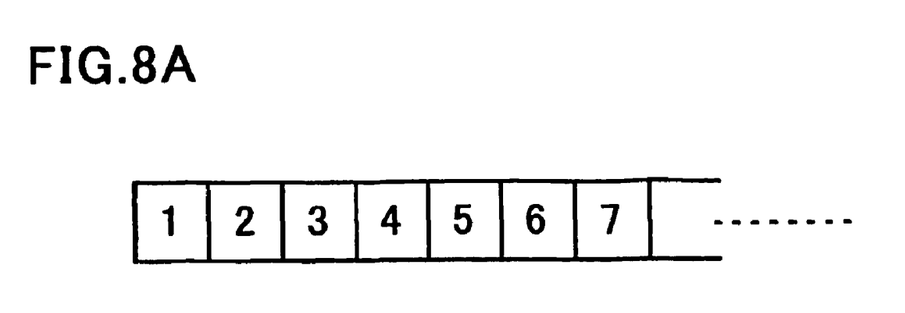
FIG. 8A illustrates an example of sequential numbers applied to a signal transmitted from a base station.
Figure 8B:
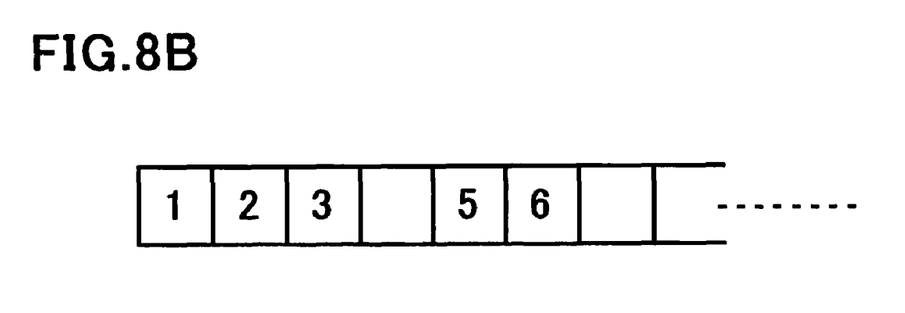
FIG. 8B illustrates an example of sequential numbers having a loss therein.

FIG. 8A illustrates an example of sequential numbers applied to a signal transmitted from a base station, and FIG. 8B illustrates an example of sequential numbers having a loss therein.

If a signal received from a base station includes all sequential numbers without any loss, as illustrated in FIG. 8A, the target SIR controller 15 is designed to judge communication quality is good, namely, communication quality is equal to or greater than threshold quality. Thus, the target SIR controller 15 lowers a target SIR by δ SIR, as shown in FIG. 7 or in step S44 in FIG. 5.

If a signal received from a base station includes a loss in sequential numbers, as illustrated in FIG. 8B, in which case, the sequential numbers 4 and 7 lack, the target SIR controller 15 is designed to judge communication quality is poor, namely, communication quality is smaller than threshold quality. Thus, the target SIR controller 15 raises a target SIR, as shown in FIG. 6.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

This application is based upon and claims the benefit of priority from Japanese Patent Application No. 2005-006306 filed on Jan. 13, 2005, the entire disclosure of which, including specification, claims, drawings and summary, is incorporated herein by reference in its entirety.

The invention claimed is:

1. A mobile communication terminal comprising:
    a first unit which measures a SIR of a signal received from a base station;
    a second unit which determines a target SIR; and
    a third unit which compares said SIR measured by said first unit to said target SIR, and produces TPC data in accordance with the result of the comparison, said TPC data controlling signal-transmission power by which said base station transmits a signal to said mobile communication terminal, said TPC data being transmitted to said base station together with a signal to be transmitted to said base station from said mobile communication terminal,
    wherein said second unit lowers said target SIR when communication quality between said mobile communication terminal and said base station is determined to be equal to or greater than threshold quality, and wherein said communication quality is a quality of communication in a predetermined time period during which a signal for calling is not received by said mobile communication terminal from said base station.

2. The mobile communication terminal as set forth in claim 1, further comprising a fourth unit which decodes a signal received from said base station, and applies CRC operation to the decoded signal, and wherein said second unit judges whether said communication quality is equal to or greater than said threshold quality, based on the result of said CRC operation.

3. The mobile communication terminal as set forth in claim 2, wherein said second unit judges said communication quality equal to or greater than said threshold quality, if there does not occur CRC-NG in said predetermined period of time.

4. The mobile communication terminal as set forth in claim 1, further comprising a fourth unit which decodes a signal received from said base station, and checks whether there is a loss in sequential numbers applied to the signal, wherein said second unit judges whether said communication quality is equal to or greater than said threshold quality, based on the result of checking said loss.

5. A method of accomplishing transmission power control in a mobile communication terminal, comprising:
  (a) measuring a SIR of a signal received from a base station;
  (b) comparing the measured SIR to a target SIR to thereby produce TPC data in accordance with the result of the comparison, said TPC data controlling signal-transmission power by which said base station transmits a signal to said mobile communication terminal;
  (c) transmitting said TPC data to said base station together with a signal to be transmitted to said base station from said mobile communication terminal; and
  (d) lowering said target SIR when communication quality between said mobile communication terminal and said base station is determined to be equal to or greater than threshold quality, and wherein said communication quality of communication in a predetermined time period during which a signal for calling is not received by said mobile communication terminal from said base station.

6. The method as set forth in claim 5, further comprising:
  (e) decoding a signal received from said base station; and
  (f) applying CRC operation to the decoded signal,
  wherein said communication quality is judged whether equal to or greater than said threshold quality, based on the result of said CRC operation.

7. The method as set forth in claim 6, wherein said communication quality is judged equal to or greater than said threshold quality, if there does not occur CRC-NG in said predetermined period of time.

8. The method as set forth in claim 5, further comprising:
  decoding a signal received from said base station; and
  checking whether there is a loss in sequential numbers applied to the signal,
  wherein said communication quality is judged whether equal to or greater than said threshold quality, based on the result of checking said loss.

9. A program for causing a computer to carry out a method of accomplishing transmission power control in a mobile communication terminal, steps executed by said computer in accordance with said program including:
  (a) comparing a SIR of a signal received from a base station to a target SIR to thereby produce TPC data in accordance with the result of the comparison, said TPC data controlling signal-transmission power by which said base station transmits a signal to said mobile communication terminal;
  (b) transmitting said TPC data to said base station together with a signal to be transmitted to said base station from said mobile communication terminal; and
  (c) lowering said target SIR when communication quality between said mobile communication terminal and said base station is determined to be equal to or greater than threshold quality, and wherein said communication quality is a quality of communication in a predetermined time period during which a signal for calling is not received by said mobile communication terminal from said base station.

10. The program as set forth in claim 9, wherein said steps further include:
  (d) decoding a signal received from said base station; and
  (e) applying CRC operation to the decoded signal,
  wherein said communication quality is judged whether equal to or greater than said threshold quality, based on the result of said CRC operation.

11. The program as set forth in claim 10, wherein said communication quality is judged equal to or greater than said threshold quality, if there does not occur CRC-NG in said predetermined period of time.

12. The program as set forth in claim 9, wherein said steps further include:
  (d) decoding a signal received from said base station; and
  (e) checking whether there is a loss in sequential numbers applied to the signal,
  wherein said communication quality is judged whether equal to or greater than said threshold quality, based on the result of checking said loss.

13. A mobile communication terminal comprising:
  first means for measuring a SIR of a signal received from a base station;
  second means for determining a target SIR; and
  third means for comparing said SIR measured by said first unit to said target SIR, and producing TPC data in accordance with the result of the comparison, said TPC data controlling signal-transmission power by which said base station transmits a signal to said mobile communication terminal, said TPC data being transmitted to said base station together with a signal to be transmitted to said base station from said mobile communication terminal,
  wherein said second means lowers said target SIR when communication quality between said mobile communication terminal and said base station is determined to be equal to or greater than threshold quality, and wherein said communication quality is a quality of communication in a predetermined time period during which a signal for calling is not received by said mobile communication terminal from said base station.

* * * * *

UNITED STATES PATENT AND TRADEMARK OFFICE
CERTIFICATE OF CORRECTION

PATENT NO. : 7,885,679 B2
APPLICATION NO. : 11/813185
DATED : February 8, 2011
INVENTOR(S) : Taisuke Hosokawa It is certified that error appears in the above-identified patent and that said Letters Patent is hereby corrected as shown below:

In the Drawings:

Sheet 4 of 9 (Reference Numeral S21) (Fig. 4A), Line 1: Delete "DEMODULATING" and insert -- DECODING --, therefor Sheet 5 of 9 (Reference Numeral S31) (FIG. 4B), Line 2: Delete "UPWARD" and insert -- UP-CHANNEL --, therefor.

Sheet 5 of 9 (Reference Numeral S31) (FIG. 4B), Line 4: Delete "UPWARD" and insert -- UP-CHANNEL --, therefor.

Sheet 5 of 9 (Reference Numeral S32) (FIG. 4B), Line 2: Delete "UPWARD" and insert -- UP-CHANNEL --, therefor.

Sheet 5 of 9 (Reference Numeral S33) (FIG. 4B), Line 2: Delete "UPWARD" and insert -- UP-CHANNEL --, therefor.

Sheet 5 of 9 (Reference Numeral S34) (FIG. 4B), Line 2: Delete "UPWARD" and insert -- UP-CHANNEL --, therefor.

Sheet 5 of 9 (Reference Numeral S35) (FIG. 4B), Line 2: Delete "UPWARD" and insert -- UP-CHANNEL --, therefor.

Sheet 5 of 9 (Reference Numeral S36) (FIG. 4B), Line 2: Delete "UPWARD" and insert -- UP-CHANNEL --, therefor.

Sheet 5 of 9 (Reference Numeral S38) (FIG. 4B), Line 2: Delete "UPWARD" and insert -- UP-CHANNEL --, therefor.

Signed and Sealed this
Twenty-third Day of July, 2013

Teresa Stanek Rea
*Acting Director of the United States Patent and Trademark Office*